United States Patent Office 3,119,033
Patented Jan. 21, 1964

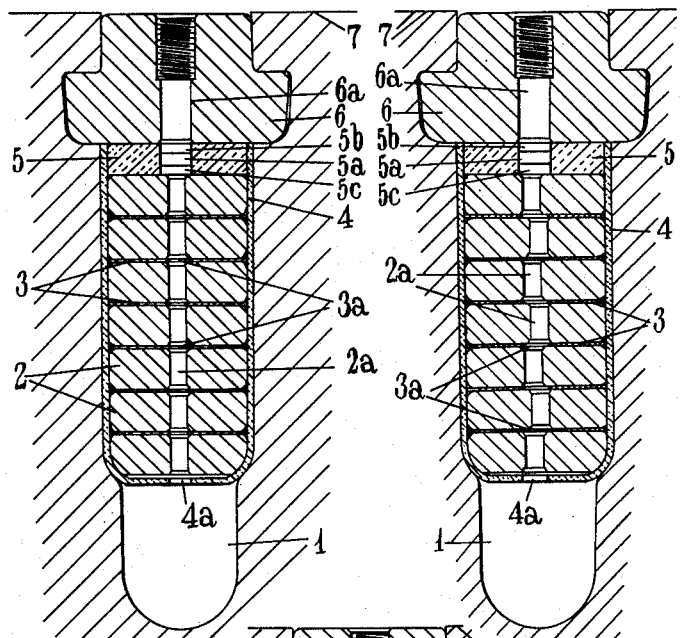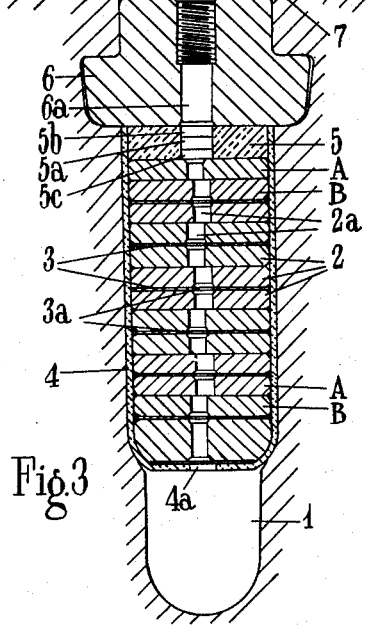
Fig.1  Fig.2  Fig.3

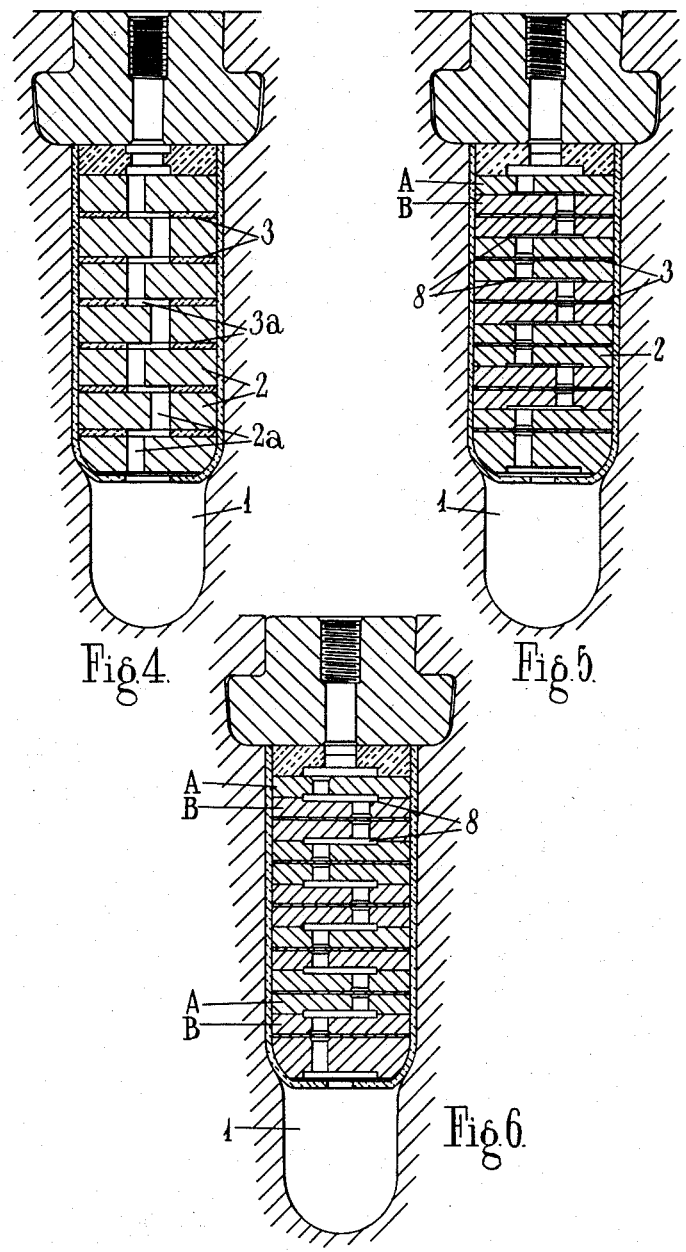

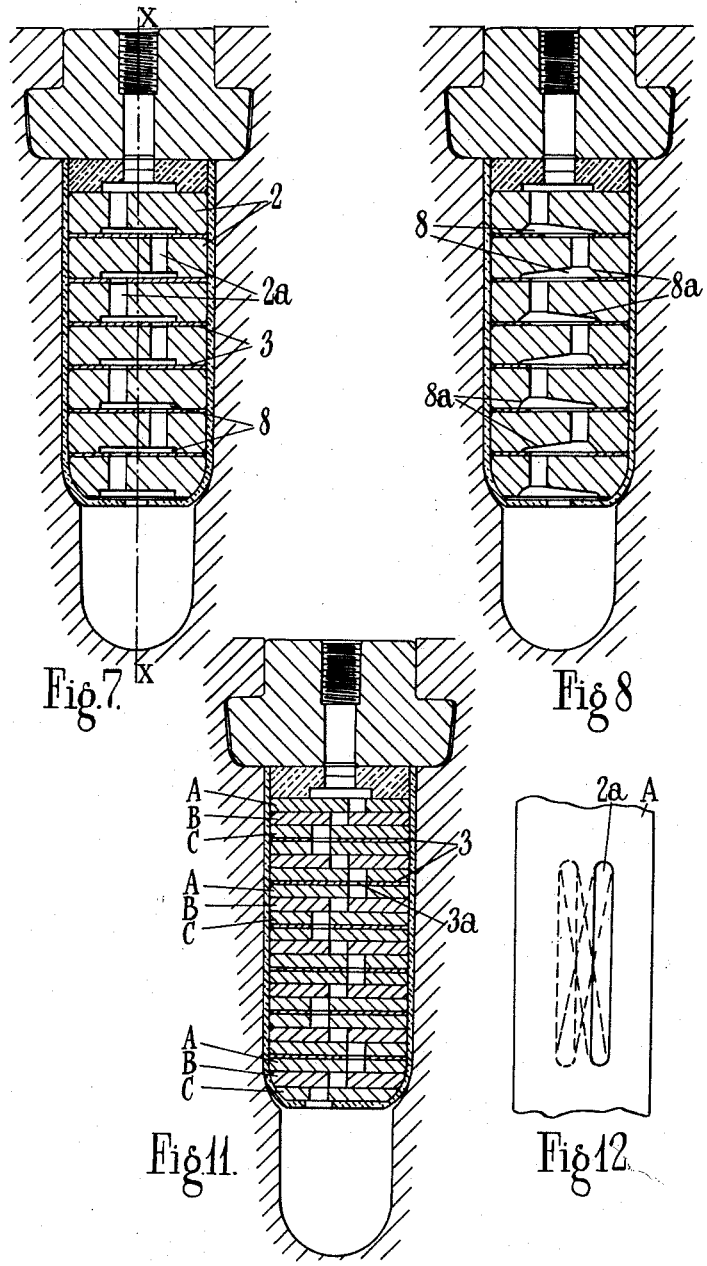

3,119,033
DYNAMO-ELECTRIC MACHINES
William Douglass Horsley, Philip Richardson, Joseph Merelie Elliott, and John Henderson, all of Newcastle-upon-Tyne, England, assignors to C. A. Parsons & Company Limited, Newcastle-upon-Tyne, England
Filed Nov. 7, 1961, Ser. No. 150,712
8 Claims. (Cl. 310—64)

This invention relates to dynamo-electric machines particularly large turbine driven alternating current generators for power station use.

It is well known that the conductors forming electrical windings of such machines can be cooled by passing a cooling fluid through the winding in direct contact with the material of the conductors.

One form of cooling common in generators for power station use is radial cooling in which the cooling fluid is caused to flow in a radial direction with respect to the central axis of the generator, through radially disposed ducts formed in the conductors of each slot.

The object of the present invention is to provide improved cooling of the conductors in dynamo electric machines employing radial cooling.

The invention consists in a cooling arrangement for the conductors of such a dynamo-electric machine as more particularly defined in the claims, the principal forms being (a) a dynamo-electric machine having a direct cooled winding which winding comprises electrical conductors extending in the direction of the axis of rotation of the machine and supported in stacked relation to one another in a series of radial planes emanating from said axis of rotation, ducts passing in the radial direction through conductors of each stack to permit the passage of cooling fluid through the stack in a radial direction, said ducts being disposed at intervals along the stacks in the direction of the said axis of rotation each duct being formed by a series of separate connected holes which are in staggered relationship with respect to one another and are disposed on either side of a radial plane passing through the stack with which they are associated; and (b) A dynamo-electric machine having a direct cooled winding which winding comprises electrical conductors extending in the direction of the axis of rotation of the machine and supported in stacked relation to one another in a series of radial planes emanating from said axis of rotation, ducts passing in the radial direction through conductors of each stack to permit the passage of cooling fluid through the stack in a radial direction said ducts being disposed at intervals along the stacks in the direction of the axis of rotation, each duct being constituted by a series of radially disposed interconnected holes in the conductors, each conductor consisting of two conductor elements superimposed one upon the other in the radial direction and each having a radially disposed hole therein, the hole in one element being displaced from that of the other element in a direction transverse to a radial plane, the hole in an element of one conductor being radially aligned with and connected to a hole in the immediately adjacent element of an adjacent conductor, the pairs of aligned holes being disposed alternately on either side of a radial plane.

Referring to the accompanying drawings:

FIGURE 1 shows a typical known arrangement of conductors for radial cooling.

FIGURES 2–8 each show a cross-section through a conductor slot of a dynamo-electric machine and show various conductors constructions and arrengements in accordance with the present invention;

FIGURE 11 is a view through a conductor slot showing a further conductor construction in accordance with the invention;

FIGURE 12 is a scrap view showing in plan the relative disposition of the ducts in the arrangement of FIGURE 11;

Figure 9:
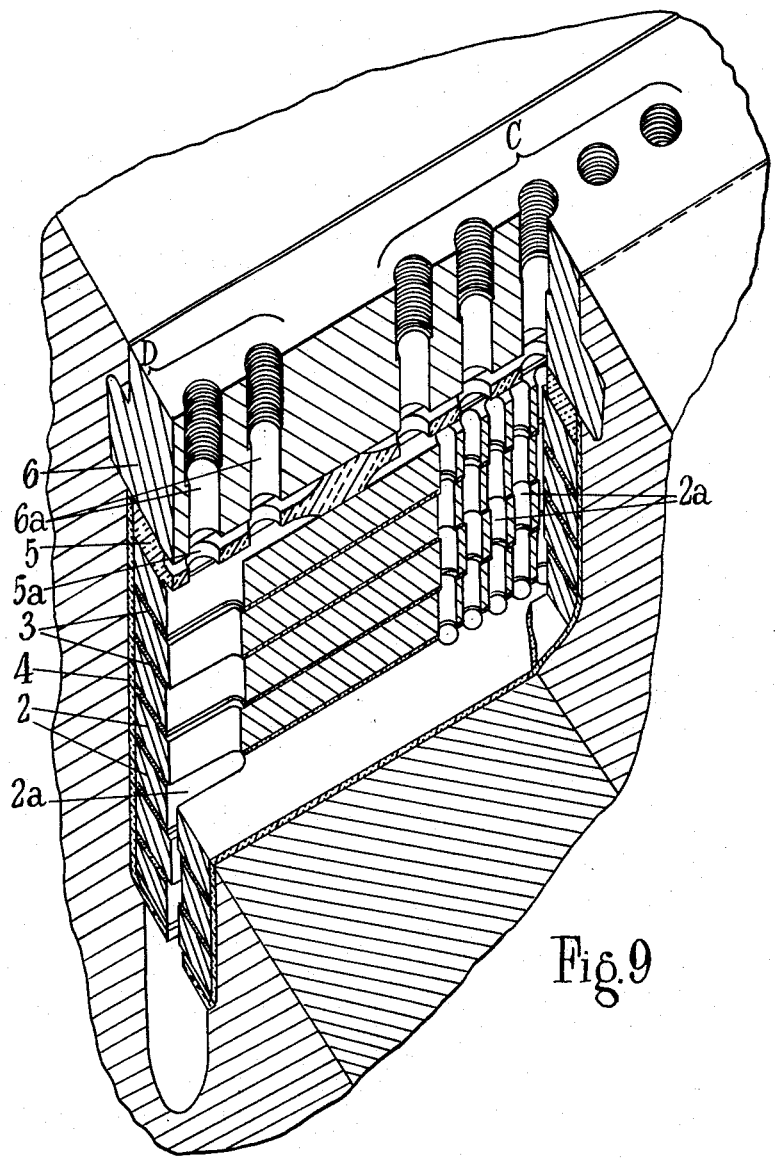
FIGURE 9 is a duplex figure in perspective view, with a cut away portion of a slot showing conductors arranged and constructed in accordance with the present invention.

Referring to FIGURE 1 of the aforesaid drawings a known arrangement, as illustrated therein, comprises a slot 1 formed in the rotor body of a dynamo-electric machine for example a large alternating current generator of the type used in power stations, Housed in the slot 1 and superimposed one upon the other in the radial direction are a number of conductors 2, each separated from one another by insulation 3. Further insulation 4 is placed between the sides of the conductors and the side of the slot 1 and insulation 5 is placed at the top of the slot. Holding the conductors in position in the slot is a wedge 6. A radial duct for cooling fluid is formed by radially aligned holes 2a in each of the conductors. Corresponding holes 3a, 4a, 5a and 6a are formed in insulation 3, 4, 5 and wedge 6 respectively.

Cooling fluid can thus flow from the lower portion of slot, through the radial duct formed by holes 2a, 3a, 4a, 5a, and 6a and out to the surface 7 of the rotor body.

The radial ducts are usually grouped together with say five or six ducts in a group and the groups are spaced apart along the length of the conductor. The radial ducts in any one group are usually further interconnected by channels 5b, 5c, formed in insulation 5. In this way should any duct in the conductors become blocked for some reason the cooling fluid can still flow from the same number of outlets. The holes 6a in wedges 6 are also interconnected in the form shown and they have their outer portions threaded for the introduction, if necessary, of restrictions or plugs into holes 6a so as to enable the balancing of cooling fluid flow through the various ducts.

In carrying the invention into effect in the forms illustrated in FIGURES 2–8 by way of example and referring first to FIGURE 2, the holes 2a forming a radial duct are arranged in staggered relation to one another in the radial direction. The remaining holes 3a, 4a, 5a and 6a remain in the same relative position shown in FIGURE 1 but holes 3a are wider than in FIGURE 1. In the form shown in FIGURE 2 the degree of stagger is such that the respective holes 2a adjacent conductors are displaced by a distance less than the radius or width of the holes.

The effect of staggering the holes is to increase the turbulence in the duct and hence increase the heat transfer.

The insulation between conductors 2 can be improved over that shown in FIGURE 2 by the arrangement of FIGURE 3 in which each conductor 2 is formed of two separate conductor elements A and B. The axis of hole 2a in element A is displaced from the axis of the hole in element B but the hole in element A of one conductor is aligned with the hole in immediately adjacent element B of an adjacent conductor. In this construction holes 3a need to be displaced in the same fashion as the holes 2a. Holes 4a, 5a and 6a remain as before.

The holes can be staggered by a distance greater than the radius or width of the holes 2 and hence the stagger and turbulence be increased. With this degree of stagger, however, it is necessary to provide some connecting channel between the adjacent holes, extending at right angles to the axes of the holes. A form of this kind is shown in FIGURE 4 in which a connecting channel between the holes 2a is formed by increasing the size of hole 3a. In order to keep the pressure drop to a minimum it is desirable with the form shown in FIGURE 4 to increase at the same time the thickness of insulation 3 so as to increase the height, in the radial direction, of the hole 3a.

The need for increasing the thickness of the insulation 3 can be obviated by the arrangement of FIGURE 5 in which again each conductor is split up into two separate elements A and B. The hole in one element A is displaced from the hole in element B by an amount greater than the radius or width of the hole and the holes are connected by a channel 8 formed in the underside of element A. The hole in element A of one conductor is aligned with the hole in the immediately adjacent element B of the adjacent conductor and because of this the insulation 3 can be of the normal thickness.

FIGURE 6 shows a modification of FIGURE 5 in which channel 8 is formed by channels in each of the elements A and B.

If it is not desirable to thicken the insulation 3 or to split up the conductor into two separate elements, the arrangement of FIGURE 7 can be adopted. Here each conductor 2 has a hole 2a located so that when the conductor is in position in the slot 1 the hole is offset from the centre line XX of the slot. At right angles to the hole 2a is formed a channel 8. By inverting alternate conductors in the slot the arrangement of FIGURE 7 is achieved with normal thickness insulation 3 between conductors.

FIGURE 8 shows the arrangement of FIGURE 7 but with the channels 8 having sloping faces 8a to promote smoother flow conditions and remove sharp edges.

FIGURE 9 shows holes 2 in either rectangular form as at the left hand side of the drawing or in circular form as at the right hand side or a combination of both. Two groups of holes are shown, C and D. Each group contains five radial ducts but only two of these can be seen in group D. The invention is not, however, limited to these numbers or to the grouping of the ducts. The shape of insulation 5 can clearly be seen, providing interconnections between the respective ducts of each group but separating the ducts of one group from those of another.

Figure 10:
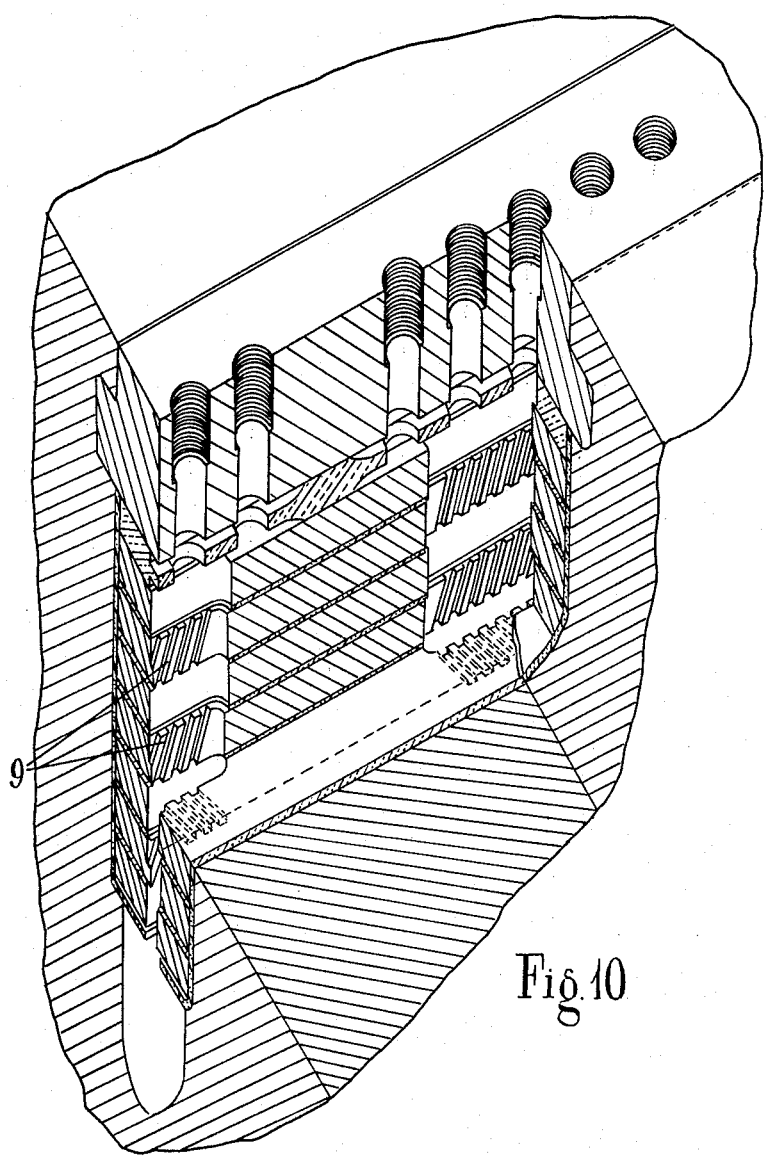
FIGURE 10 is a perspective view similar to FIGURE 9 but showing grooves arranged in the walls of the holes in the conductor to promote helical or swirling flow in the cooling fluid.

FIGURE 10 is a similar view to that of FIGURE 9 and shows grooves or serrations 9 which are disposed at an angle to the main direction of fluid flow through the radial duct so as to promote swirl or a helical flow path in the fluid. The holes are shown to be rectangular in shape but if circular holes are used similar effects can be obtained by having the grooves or serrations extend helically about the axis of the hole. It may also be noted that with the hole shown in FIGURE 10 the grooves are disposed in opposite directions on opposing faces of adjacent holes to promote the helical or swirling flow.

Figure 13:
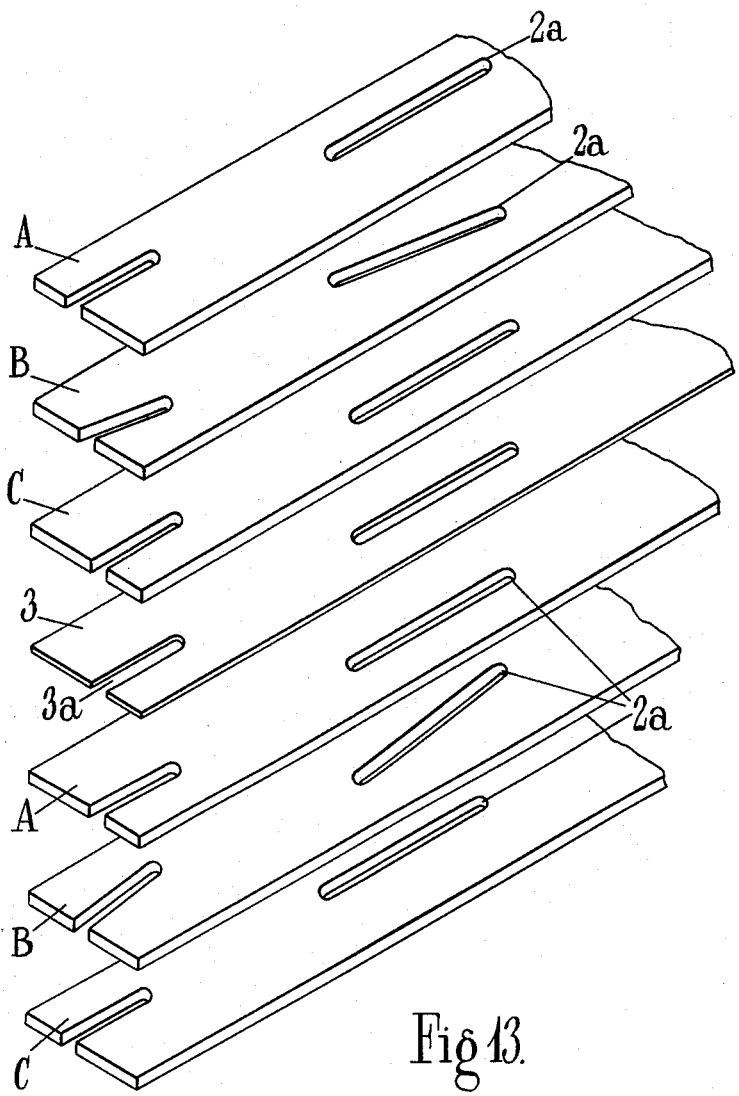
FIGURE 13 is an exploded view of two sets of three conductor elements of a slot showing the disposition of the ducts in accordance with the arrangement of FIGURE 11.

Referring to FIGURES 11–13, the holes 2a are in the form of rectangular openings extending in the axial direction of the rotor but they are not necessarily parallel to each other in this direction as can be seen from FIGURES 12 and 13. The conductors are arranged in groups of three elements, A, B, C, although there can be a different number of elements in group if desired; the hole 2a in the element B is disposed so as to intersect the holes 2a in the upper and lower conductors A and C of the group.

For other numbers of conductor elements in a group the requirement is that the holes in one conductor should intersect the hole of an adjacent element at some place in its length in the axial direction. For communication between the holes of adjacent conductors through the insulation 3 it is preferable for the holes 3a to be disposed all in one direction as is the case in FIGURE 11, where the hole 2a in element C of one conductor is axial and parallel to the hole 2a in element A of an adjacent conductor. Consequently the hole 3a in insulation 3 is also in the axial direction of the rotor.

With the various arrangements described the resulting increased turbulence and helical or swirling nature of flow considerably increase the heat transfer. There is also an appreciable increase in cooling surface. The increased heat transfer is obtained without sacrifice of insulation efficiency or without, if so desired, increasing the thickness of the insulation.

Whilst the invention has been particularly described with reference to the rotor of an alternating current generator of the type used in power stations it can also be used in the stators of such machines and also in all dynamo-electric machines employing radial cooling of the conductors.

We claim:

1. A dynamo-electric machine having a direct cooled winding which winding comprises electrical conductors extending in the direction of the axis of rotaiton of the machine and supported in stacked relation to one another in a series of radial planes emanating from said axis of rotation, ducts passing in the radial direction through conductors of each stack to permit the passage of cooling fluid through the stack in a radial direction, said ducts being disposed at intervals along the stacks in the direction of the said axis of rotation each duct being formed by a series of separate connected holes which are in staggered relationship with respect to one another and are disposed on either side of a radial plane passing through the stack with which they are associated.

2. A dynamo-electric machine as claimed in claim 1 in which each duct is constituted by a series of radially disposed interconnected holes in the conductors, a hole in one conductor being displaced in a direction transverse to a radial plane with respect to the hole in an adjacent conductor for a distance less than the width of the hole in said direction.

3. A dynamo-electric machine having a direct cooled winding which winding comprises electrical conductors extending in the direction of the axis of rotation of the machine and supported in stacked relation to one another in a series of radial planes emanating from said axis of rotation, ducts passing in the radial direction through conductors of each stack to permit the passage of cooling fluid through the stack in a radial direction said ducts being disposed at intervals along the stacks in the direction of the axis of rotation, each duct being constituted by a series of radially disposed interconnected holes in the conductors, each conductor consisting of two conductor elements superimposed one upon the other in the radial direction and each having a radially disposed hole therein, the hole in one element being displaced from that of the other element in a direction transverse to a radial plane the hole in an element of one conductor being radially aligned with and connected to a hole in the immediately adjacent element of an adjacent conductor, the pairs of aligned holes being disposed alternately on either side of a radial plane.

4. A dynamo-electric machine as claimed in claim 1 in which the duct is constituted by a series of radially disposed interconnected holes in the conductors, a hole in one conductor being displaced in a direction transverse to a radial plane with respect to the holes of adjacent conductors, the amount of displacement being greater than the width of the holes in the said direction and passages of insulation between conductors to interconnect said holes.

5. A dynamo-electric machine as claimed in claim 1 in which each conductor consists of two separate conductor elements superimposed one upon the other in the radial direction and each duct is constituted by a number of radially directed interconnected holes in the conductor elements, the hole in one element being displaced from that of the other element in a direction transverse to a radial plane by an amount greater than the width of the hole in the said direction the hole in an element of one conductor being aligned with the hole in the immediately adjacent element of an adjacent conductor and a channel formed between adjacent elements to interconnect said holes.

6. A dynamo-electric machine as claimed in claim 1 in which each duct is constituted by a series of radially directed interconnected holes in the conductors, each conductor having a radially directed hole therein offset from the central axis of the conductor in a direction transverse to a radial plane by an amount greater than the width of the hole in said direction, and a channel formed on one side of said conductor opening into the surface of the conductor communicating with said hole and extending in a direction transverse to the radial plane, adjacent conductors being disposed in inverted relation to one another with the channel of one conductor interconnecting the hole of said conductor and the hole of an adjacent conductor.

7. A dynamo-electric machine as claimed in claim 1 in which each duct is constituted by radially directed interconnected holes in the conductors, each hole being elongated and having its longitudinal axis disposed at an oblique angle to the direction of the axis of rotation, adjacent conductors being disposed in inverted relation to one another whereby a portion of a hole in one conductor intersects the holes in adjacent conductors.

8. A dynamo-electric machine as claimed in claim 1 in which holes constituting part of each duct have serrations formed in the sides thereof at an angle to the radial direction to promote a helical flow path for the cooling fluid about the radial axes of said holes.

References Cited in the file of this patent

UNITED STATES PATENTS 2,986,664     Willyoung _____ May 30, 1961

FOREIGN PATENTS 746,005     Great Britain _____ Mar. 7, 1956
813,728     Germany _____ Sept. 17, 1951